US008370620B2

(12) United States Patent
Marivoet et al.

(10) Patent No.: US 8,370,620 B2
(45) Date of Patent: Feb. 5, 2013

(54) DISTRIBUTION SYSTEM AND METHOD OF DISTRIBUTING CONTENT FILES

(75) Inventors: Philip Marivoet, Tienen (BE); Andreas Papaspyropoulos, Brussels (BE); Christopher Rutherford, Schaarbeek (BE); Olivier Elshocht, Brussels (BE); Jaqueline Mallett, Brussels (BE); Tom Hostyn, Halle (BE)

(73) Assignee: Sony Corporation, Tokyo (JP)

( * ) Notice: Subject to any disclaimer, the term of this patent is extended or adjusted under 35 U.S.C. 154(b) by 434 days.

(21) Appl. No.: 12/698,573

(22) Filed: Feb. 2, 2010

(65) Prior Publication Data

US 2010/0250917 A1 Sep. 30, 2010

(30) Foreign Application Priority Data

Mar. 30, 2009 (GB) .................................. 0905447.9

(51) Int. Cl.
*H04L 29/06* (2006.01)
(52) U.S. Cl. ............ 713/150; 713/168; 713/171; 726/2; 726/3; 726/10
(58) Field of Classification Search .................. 726/10
See application file for complete search history.

(56) References Cited

U.S. PATENT DOCUMENTS

| | | | | |
|---|---|---|---|---|
| 7,536,470 B2 * | 5/2009 | Li et al. | .................. | 709/231 |
| 7,613,770 B2 * | 11/2009 | Li | .................. | 709/203 |
| 7,743,163 B2 * | 6/2010 | Ruppert | .................. | 709/232 |
| 7,957,280 B2 * | 6/2011 | Cohen et al. | .................. | 370/230 |
| 2001/0034705 A1 * | 10/2001 | Rhoads et al. | .................. | 705/39 |
| 2002/0178255 A1 * | 11/2002 | Hobart | .................. | 709/224 |
| 2003/0191720 A1 * | 10/2003 | Wibisono | .................. | 705/54 |
| 2004/0002920 A1 * | 1/2004 | Prohel et al. | .................. | 705/51 |
| 2004/0122958 A1 | 6/2004 | Wardrop | | |
| 2007/0198636 A1 * | 8/2007 | Inamoto et al. | .................. | 709/203 |
| 2007/0265971 A1 * | 11/2007 | Smalley | .................. | 705/52 |
| 2007/0266446 A1 * | 11/2007 | Aaron | .................. | 726/30 |
| 2008/0028041 A1 * | 1/2008 | Jung et al. | .................. | 709/218 |

(Continued)

OTHER PUBLICATIONS

Paul Judge, et al. "Citadel: a Content Protection Architecture for Decentralized Peer-to-Peer File Sharing Systems" Globecom 2003, IEEE Global Telecommunications Conference, 2003, vol. 3, pp. 1496-1500.

(Continued)

*Primary Examiner* — Ponnoreay Pich
(74) *Attorney, Agent, or Firm* — Oblon, Spivak, McClelland, Maier & Neustadt, L.L.P.

(57) ABSTRACT

A distribution system including, for connection over a network a plurality of client upload devices, each client upload device storing one or more chunks of a content file, a client download device configured to download from the client upload devices chunks of the content file stored by the respective client upload devices and an incentive device configured to generate token data packets exchangeable for chunks of the content file. The client download device is configured to acquire a plurality of token data packets from the incentive device and to communicate with individual respective client upload devices and thereby download, in exchange for respective token data packets, stored chunks of the content file. Each client upload device is configured to communicate with the client download device and, thereby, upload to the client download device stored chunks of the content file in exchange for token data packets acquired by the client download device from the incentive device and is configured to transmit to the incentive device token data packets received from the client download device.

18 Claims, 7 Drawing Sheets

U.S. PATENT DOCUMENTS

2008/0066182 A1* 3/2008 Hickmott et al. ............... 726/26
2008/0222235 A1* 9/2008 Hurst et al. ................... 709/201
2008/0289006 A1 11/2008 Hock et al.
2008/0307094 A1* 12/2008 Karonen et al. .............. 709/226
2009/0083148 A1* 3/2009 Hwang et al. ................. 705/14
2009/0265178 A1* 10/2009 Strom et al. ..................... 705/1

OTHER PUBLICATIONS

U.S. Appl. No. 12/698,584, filed Feb. 2, 2010, Mallett, et al.

* cited by examiner

DISTRIBUTION SYSTEM AND METHOD OF DISTRIBUTING CONTENT FILES

CROSS-REFERENCE TO RELATED APPLICATIONS

This application is based upon and claims the benefit of priority from British Application No. 0905447.9 filed 30 Mar. 2009, the entire contents of which are incorporated by reference.

BACKGROUND OF THE INVENTION

1. Field of the Invention

The present invention relates to a distribution system and a method of distributing content files, in particular to distribution of content files which are divided into chunks of data which are stored at and can be downloaded from a plurality of respective client devices.

2. Description of the Related Art

Peer-to-peer (P2P) networks are well-known for distributing content files. Chunks of data, for instance in the form of packets, are distributed between client devices forming the peer-to-peer network such that a client device can obtain a complete content file by downloading different respective chunks of that content file from a variety of different respective client devices on the network. Services such as the BBC I-player™ allow free downloading of content files in this manner.

Systems also exist allowing sales of content over a network, for instance the Internet. In such systems, a server is provided on the network from which all of the chunks or packets of a content file can be downloaded by individual respective client devices on the network. For instance, a content file may be downloaded for purchase or rental in exchange for a financial consideration. Such systems exist allowing download of movies to Sony™ devices such as the PlayStation™ and the PlayStation Portable™.

OBJECTS AND SUMMARY OF THE INVENTION

The present application recognises that there are advantages to distributing content files by means of peer-to-peer networks. In general, it will be well understood that, by distributing content using a peer-to-peer network, the total bandwidth required at a central source server is greatly reduced and the bandwidth consumed by the distribution is itself better distributed throughout the network.

The present application also recognises that many networks provide much larger bandwidths for downloading to client devices than for uploading from those client devices. Limits may be placed on the amount of data that can be uploaded from a client device onto the network and/or costs imposed on the client devices. Hence, there is an additional problem that many users of the client devices may prefer those client devices not to be used for uploading data onto the network.

It is an object of the present invention to at least reduce one or more of these problems.

According to the present invention, there is provided a distribution system including, for connection over a network, a plurality of client upload devices, each client upload device storing one or more chunks of a content file, a client download device configured to download from the client upload devices chunks of the content file stored by the respective client upload devices and an incentive device configured to generate token data packets exchangeable for chunks of the content file. The client download device is configured to acquire a plurality of token data packets from the incentive device and to communicate with individual respective client upload devices and thereby download, in exchange for respective token data packets, stored chunks of the content file. Each client upload device is configured to communicate with the client download device and, thereby, upload to the client download device stored chunks of the content file in exchange for token data packets acquired by the client download device from the incentive device and is configured to transmit to the incentive device token data packets received from the client download device.

According to the present invention, there is also provided a method of distributing content files to client devices on a network using a plurality of client upload devices connected to the network, each client upload device storing one or more chunks of a content file. The method includes generating token data packets exchangeable for chunks of the content file, providing the token data packets to a client download device, exchanging token data packets from the client download device for chunks of the content file stored in respective client upload devices and transmitting token data packets received from the client download device to an incentive device for tracking the distribution.

The present invention similarly provides a client upload device, a client download device and an incentive device.

In particular, there may be provided a client upload device for connection to a network, the network having connected thereto at least one other client upload device, a client download device for downloading a content file from said client upload device and from said at least one other client upload device and an incentive device for producing token data packets. The client upload device includes a memory storing one or more chunks of the content file, an uploader configured to communicate with the client download device and, thereby, upload to the client download device stored chunks of the content file in exchange for token data packets acquired by the client download device from the incentive device and a transmitter configured to transmit to the incentive device token data packets received from the client download device.

There may be provided a client download device for connection to a network, the network having connected thereto a plurality of client upload devices, each client upload device storing one or more chunks of a content file, and an incentive device for generating token data packets. The client download device includes an acquirer configured to acquire from the incentive device a plurality of token data packets and a downloader configured to communicate with individual respective client upload devices and thereby download stored chunks of the content file in exchange for respective token data packets.

There may be provided an incentive device for connection to a network, the network having connected thereto a plurality of client upload devices, each client upload device storing one or more chunks of a content file, and a client download device for downloading chunks of the content file from the client upload devices. The incentive device includes a token generator for generating token data packets exchangeable for chunks of the content file, a provider configured to provide the client download device with a plurality of token data packets so as to enable download of chunks of the content file from a plurality of client upload devices in exchange for respective token data packets, and a receiver configured to receive from the client upload devices token data packets received by the client upload devices in exchange for upload of chunks of the content file to the client download device.

Similarly, the present invention provides a method of uploading chunks of a content file, a method of downloading a content file and a method of monitoring distribution of a content file.

In particular, the present invention provides a method of uploading chunks of a content file to a client download device over a network including storing one or more chunks of the content file, communicating with the client download device thereby to upload to the client download device stored chunks of the content file in exchange for token data packets acquired by the client download device from an incentive device on the network, and transmitting to the incentive device token data packets received from the client download device.

The present invention provides a method of downloading a content file from a plurality of client upload devices over a network including acquiring from an incentive device on the network a plurality of token data packets, and communicating with individual respective client upload devices, each client upload device storing one or more chunks of the content file, thereby to download stored chunks of the content file in exchange for respective token data packets.

The present invention provides a method of monitoring distribution of a content file over a network including generating token data packets exchangeable for chunks of the content file, providing a client download device with a plurality of token data packets so as to enable download of chunks of the content file from a plurality of client upload devices in exchange for respective token data packets, and receiving from client upload devices token data packets received by the client upload devices in exchange for upload of chunks of the content file to the client download device.

Of course, these methods may be implemented in software on computer terminals or servers forming the client devices and incentive device.

In this way, it is possible to track accurately the distribution of chunks of content file and, hence, take steps to prevent unauthorised distribution and copying. In particular, the token data packets act as tokens which client upload devices can send back to the incentive device so as to achieve rewards in the system as a whole. Such rewards might be financial or credits for other downloads. They may also include other rewards, such as merchandise goods relating to a download movie, or credits towards such rewards. It thus becomes in the interest of a client upload device to provide chunks of content file which may later be downloaded by other client download devices. In other words, an incentive is provided for users to allow their client devices to be used as client upload devices in the system.

In order for a device on the network to operate as a client download device, it is necessary for that device to obtain the tokens by way of the token data packets. To obtain these tokens from the incentive device, it is envisaged that some form of payment will be required and, preferably, some registration of the user's details. Subsequent distribution of the tokens through the system can then be attributed to the original client download device which purchased the tokens.

The system then provides for chunks of the content file to be downloaded to a client download device only in exchange for providing respective token data packets as tokens to the respective client upload devices. When these are returned to the incentive device by the client upload device, it is possible for the system to check that the overall system is not being abused. In particular, if copies of tokens are received by the incentive device, checks can be carried out to consider whether the client download device has duplicated the tokens with which it was provided in order to receive additional unauthorised content or whether client uploaded devices are duplicating the tokens in order to receive additional unwarranted rewards.

In order to add further security to the system, each client upload device may be configured to upload to the client download device chunks of the content file in encrypted form. The client download device may be configured so as, upon receipt of a chunk of the content file in encrypted form, to send to the client upload device from which the chunk of content file was received a token data packet together with a request for a decryption key. Each client upload device may be configured so as, upon receipt of a token data packet and a request for a decryption key from the client download device, to send to the client download device the decryption key for decrypting the encrypted chunk of the content file.

In this way, the system prevents a client download device obtaining a chunk of the content file without then providing the token data to the client upload device.

Preferably, the client download device is configured so as, upon receipt of a decryption key from a client upload device, to decrypt the respective chunk of the content file and to send to the incentive device the decryption key thereby identifying to the incentive device the respective chunk and the client upload device from which the respective chunk was received.

In this way, the client download device acts to report back to the incentive device regarding the client upload device to which it provided a token data packet and from which it received a respective chunk. This can be correlated in the system with receipt of the token data packet from the respective client upload device. As a result, anomalies in distribution of data chunks and token data packets can be identified more easily.

The incentive device may be configured to provide a plurality of token data packets to the client download device in response to a request for the content file in chunks and to provide with the plurality of token data packets a peer list which indicates client upload devices on the network from which chunks of the content file can be downloaded.

In this way, the client download device is directed to appropriate client upload devices from which to acquire appropriate chunks and the system can expect to receive token data packets from at least a selection of those suggested client upload devices.

Once again, overseeing the system so as to avoid abuse can be improved.

The incentive device may be configured to act as a client uploader device insofar as communicating with the client download device to upload to the client download device stored chunks of the content file.

In other words, the incentive device itself may store chunks of the content file required by the client download device. In these circumstances, there is no reason why the client download device might not also download chunks from the incentive device. Of course, in this scenario, token data packets which are exchanged for the chunks of the content file will be transmitted directly to the incentive device. In some systems the incentive device may itself still be entitled to rewards for receiving the token data packet, whereas, in other systems, this may not be necessary.

The incentive device may contain the entire content file. In this situation, if the incentive device receives a request from the client download device for download of the entire content file, then the incentive device can upload to the client download device all of the chunks of the content file. Typically such a situation might arise where the content file is very new and not yet distributed to any great extent around the network.

In a similar manner, the system may be provided with a separate server for connection over the network. That server may contain the entire content file and hence provide all of the chunks of the content file available for upload.

As mentioned above, client upload devices may be rewarded in response to sending token data packets. Hence, the incentive device may be configured to reward client upload devices according to token data packets received from respective client upload devices. In one embodiment, the incentive device may be configured to reward client upload devices by providing to the client upload devices new token data packets for exchange for chunks of other content files. In another embodiment, participants in the system may be allowed to trade or gift tokens with each other. This would allow, for example, users who, because of high bandwidth connections, or other circumstances, provide more data to the network than they can use to gift other users in the network with tokens for their use.

Because, inevitably, users of the network in which the system is embodied will try to abuse the system, each client device may be provided to include a blacklist memory for storing information identifying other individual client devices, whether client upload devices or client download devices, found not to be trustworthy. Each client device may similarly be provided with a reporter for periodically transmitting the stored information to the incentive device.

In this way, the system can build up knowledge of a pattern of abuse of the system. Where client devices, whether client upload devices or client download devices are registered in some way, the system may then refuse to operate with client devices found to be abusing the system. The blacklisting can be implemented on the server. The blacklisting should have real consequences. E.g. the user is no longer able to buy new content from the service, or is no longer able to connect at all. In this way, the user should have no access to trackers. Clients can be blacklisted by being refused access to the service (via login mechanisms), by being excluded from all tracking information, and on query to the server by other clients.

It will be appreciated that client upload devices may be configured also to operate as client download devices with respect to other content files. In particular, although a client upload device may contain chunks of one content file which it can upload for a particular client download device, that same client upload device may require download of chunks from another content file. In this respect, the client upload device will operate as a client download device.

It should be noted that it is possible for the system to include client download devices which do not operate as client upload devices. Users of those client download devices may choose merely to purchase content by purchasing token data packets without wishing their devices to be used for upload of data.

Each token data packet may contain information about the incentive device that generated the respective token data packet and also information about the client download device to which that respective token packet was provided.

In this way, where users of the system attempt to abuse the system by producing fake token data packets or duplicating token data packets, it becomes easier to spot the non-authentic token data packets and their use within the system.

Each chunk of the content file may be numbered and have a unique ID.

This helps to track distribution of data throughout the system.

It is possible for the system to issue individually respective token data packets for respective chunks of content file, by referring to the ID. In this way, it becomes even more difficult for users to abuse the system.

Depending on the nature of the content file and the distribution system, it is possible for chunks to be in any appropriate size, for instance predetermined sizes may be between 16 KB and 1 MB or, as another example between 256 KB and 1 GB. In this regard, actual content files need not be multiples of the proposed chunk size such that, for any content file, the data contained in at least one chunk is likely to be less than the proposed chunk size.

According to the present invention, there is also provided a distribution system including, for connection to a network a client upload device storing one or more chunks of a content file and configured to generate respective associated report data packets identifying the chunks of the content files and respective chains of client upload devices from which the chunks were uploaded, a client download device configured to download from the client upload device chunks of the content file together with the generated respective associated report data packets and an incentive device for monitoring distribution of content files on the network. One of the client upload device and the client download device is configured to report to the incentive device by sending the respective associated report data packets of chunks of content files uploaded by the client upload device for download by the client download device and the other of the client upload device and the client download device is configured to report to the incentive device either by sending the respective associated report data packets of chunks of content files uploaded by the client upload device for download by the client download device or by sending a report identifying the chunks of content files uploaded by the client upload device for download by the client download device and identifying said one of client upload device and the client download device.

According to the present invention, there is also provided a method of distributing content files to client devices on a network using a plurality of client upload devices connected to the network, each client upload device storing one or more chunks of a content file. The method includes generating respective associated report data packets identifying the chunks of the content files and respective chains of client upload devices from which the chunks were uploaded, downloading to a client download device chunks of the content files together with the generated respective associated report data packets and reporting download of chunks of a content file to a client download device from an upload of that chunk from a client upload device by sending from one of the client upload device and the client download device the respective associated report data packets and sending from the other of the client upload device and the client download device either the respective associated report data packets or a report identifying the chunks of content file and identifying one of the client upload device and the client download device.

The present invention similarly provides a client upload device, a client download device and an incentive device.

In particular, there may be provided a client device for connection to a network, the network having connected thereto an incentive device for monitoring distribution of content files on the network and a plurality of client upload devices, each client upload device storing one or more chunks of content files and generating respective associated report data packets identifying the chunks of the content files and respective chains of client upload devices from which the chunks were uploaded. The client device includes a downloader configured to communicate with individual respective client upload devices thereby to download stored chunks of content files together with the respective associated report data packets, a memory for storing downloaded chunks of content files together with respective associated report data packets and a download reporter configured to report to the incentive device download of chunks of content files by sending to the incentive device the respective associated report data packets received from the client upload devices with the chunks of content files.

In order to operate as a client download device, preferably, the network has connected thereto a client download device for downloading from the client device chunks of content files stored in the memory.

The client device may further include an uploader configured to communicate with the client download device thereby to upload to the client download device stored chunks of content files. A report generator may be configured to generate, for each chunk of the content files to be uploaded, a respective associated report data packet identifying the respective chunk of the content files and the respective chain of client upload devices, including the client device, from which the chunk was uploaded. The uploader may be configured to upload to the client download device stored chunks of content files together with the respective associated report data packets.

Preferably, the client device further includes an upload reporter configured to report to the incentive device upload of the chunks of content files by sending to the incentive device a report identifying the chunks of content files uploaded to the client download device and identifying the client download device.

Alternatively, the upload reporter may be configured to report to the incentive device upload of the chunks of content files by sending to the incentive device the generated respective associated report data packets.

There may be provided an incentive device for connection to a network, the network having connected thereto a plurality of client devices, each client device storing one or more chunks of a content file and generating respective associated report data packets identifying the chunks of the content files and the respective chains of client devices from which the chunks were uploaded. The incentive device includes a download report receiver configured to receive from client devices, upon download of chunks of content files from other client devices, a download report, and an upload report receiver configured to receive from client devices, upon upload of chunks of content files to other client devices, an upload report. One of the download report and the upload report include respective associated report data packets of chunks of content files uploaded by the client upload device for download by the client download device and the other of the download report and the upload report includes either the respective associated report data packets of chunks of content files uploaded by the client upload device for download by the client download device or a report identifying the chunks of content files uploaded by the client upload device for download by the client download device and identifying the client device sending said one of the download report and the upload report.

Similarly, the present invention provides a method of uploading chunks of a content file, a method of downloading a content file and a method of monitoring distribution of a content file.

In particular, the present invention provides a method of downloading chunks of a content file from a plurality of client upload devices which generate respective associated report data packets identifying the chunks of the content files and respective chains of client upload devices from which the chunks were uploaded. The method includes communicating with individual respective client upload devices thereby to download stored chunks of content files together with the respective associated report data packets, storing downloaded chunks of content files together with respective associated report data packets, and reporting to an incentive device download of chunks of content files by sending to the incentive device the respective associated report data packets received from the client upload devices with the chunks of content files.

When operating to upload chunks, preferably the method includes communicating with a client download device so as to upload to the client download device stored chunks of content files. For each chunk of the content files to be uploaded, a respective associated report data packet may be generated identifying the respective chunk of the content files and respective chain of client upload devices from which the chunk was uploaded. The stored chunks of content files may be uploaded to the client download device together with respective associated report data packets.

Preferably, the method includes reporting upload of the chunks of content files by sending a report identifying the chunks of content files uploaded to the client download device and identifying the client download device.

Alternatively, the method includes reporting to the incentive device upload of the chunks of content files by sending to the incentive device the generated respective associated report data packets.

The present invention also provides a method of monitoring distribution of content files over a network including a plurality of client devices, each client device storing one or more chunks of a content file and generating respective associated report data packets identifying the chunks of the content files and respective chains of client devices from which the chunks were downloaded. The method includes receiving from client devices, upon download of chunks of content files from other client devices, a download report, and receiving from client devices, upon upload of chunks of content files to other client devices, an upload report. One of the download report and the upload report include respective associated report data packets of chunks of content files uploaded by the client upload device for download by the client download device and the other of the download report and the upload report includes either the respective associated report data packets of chunks of content files uploaded by the client upload device for download by the client download device or a report identifying the chunks of content files uploaded by the client upload device for download by the client download device and identifying the client device sending said one of the download report and the upload report.

Of course, these methods may be implemented in software on computer terminals or servers forming the client devices and incentive device.

In this way, it is possible to verify a chain of trust in the distribution system. By virtue of the report data packets providing an indication of the chain of client upload devices from which chunks were uploaded and, in particular, providing this indication for each upload/download transaction, it becomes possible to provide a map or graph of distribution of chunks throughout the network. For each chunk, the reports provided for each download/upload transaction should correlate. If it is found that one or more client devices provide report data packets indicating a different chain to chains reported by other client devices, then misuse can be detected by the system.

In any particular download/upload transaction, it is sufficient for one of either the uploading client device or the downloading client device to provide the report data packet including the client upload chain information, provided that the other of the devices in the transaction confirms the transaction between those two devices. However, it is possible for both the client upload device and the client download device to provide the respective associated report data packets. In this respect, the client download device may either report with the respective associated report data packets received from the client upload device or with updated report data packets.

The system allows accurate monitoring of the distribution of chunks and, hence, allows steps to be taken to prevent unauthorised distribution and copying. Indeed, as a result of the added security in the system, it becomes possible to provide incentive rewards to uploading devices. Such rewards can be financial or credits for other downloads. In this way, it becomes in the interest of a client upload device to upload chunks of content file for download by other client download devices. In other words, an incentive is provided for users to allow their client devices to be used as client upload devices in the system.

It is envisaged that at least the client upload devices will register themselves with the system in some way. For instance, for each client device, the user's details will be provided as registration, in some reliable form, for instance including some form of payment, such as credit card or bank details.

If a client device is found to be misusing the system, then that client device can be removed from the system, possibly together with any other client device registered to the user.

As well as providing details of the chain of client devices from which the chunks were uploaded, the respective associated report data packets could identify the server from which the respective chunks of content file originated. Of course, this is merely identification of the first device in the chain.

Preferably, the report generator of the client devices is configured to append to each respective associated report data packet downloaded from a client upload device information identifying the client device in which the report generator is included.

In this way, the client devices maintain the respective associated report data packets in updated form as chunks are passed from client device to client device.

It is possible to provide an embodiment without encryption. However, this would allow individual nodes to forge reports more easily.

Preferably, the respective associated report data packets are encrypted successively by each respective report generator in the chain of client upload devices.

In this way, subsequent client devices in the chain will not be able to read information relating to earlier parts of the chain, thus making abuse of the system more difficult.

Each additional piece of chain information added by a respective client device may be encrypted or signed separately.

Preferably, the report data packets include information identifying up to a predetermined maximum number of client upload devices in the chain.

This prevents the report data packets being undesirably large.

The report generator may be configured to delete the information identifying the client device first in the chain if the predetermined maximum would otherwise be exceeded when appending the information identifying the client device in which the report generator is included.

Alternatively, the report generator may be configured to replace the information identifying the client upload device in the chain with a summary report when reaching the predetermined maximum.

It is possible for the download and upload reporters of the client devices to report to the incentive device at the time of each respective download/upload transaction. However, alternatively, the download and upload reporters may be configured to report in batches or the download and upload reports may be configured statistically in order to provide sufficient coverage in aggregate. In other words, the download and upload reporters may be configured to report samples of their data that are statistically representative of the total data they have collected on the file transfers at their node. This may be necessary for very large swarms, with potentially millions of nodes, where real time data collection constraints on data collection prevent all the possible reports from being collected.

These batches may be sent once a predetermined number of reports have been gathered or after a predetermined period of time since the last batch of reports were sent.

The incentive device may be configured to reward client devices according to reported uploaded chunks of content files.

Preferably, in order to monitor more effectively the distribution of chunks, each chunk of the content file may be numbered and have a unique ID.

This also facilitates association of report data packets with chunks of content file.

For example, chunks will be a predetermined size, possibly between 256 KB and 1 GB, determined by the requirements of the network and data characteristics available to the application.

It will be appreciated that the various features of the various embodiments and variations discussed above can be combined in order to result in combined advantages.

DETAILED DESCRIPTION OF THE PREFERRED EMBODIMENTS

The invention will be more clearly understood from the following description, given by way of example only, with reference to the accompanying drawings.

Figure 1:
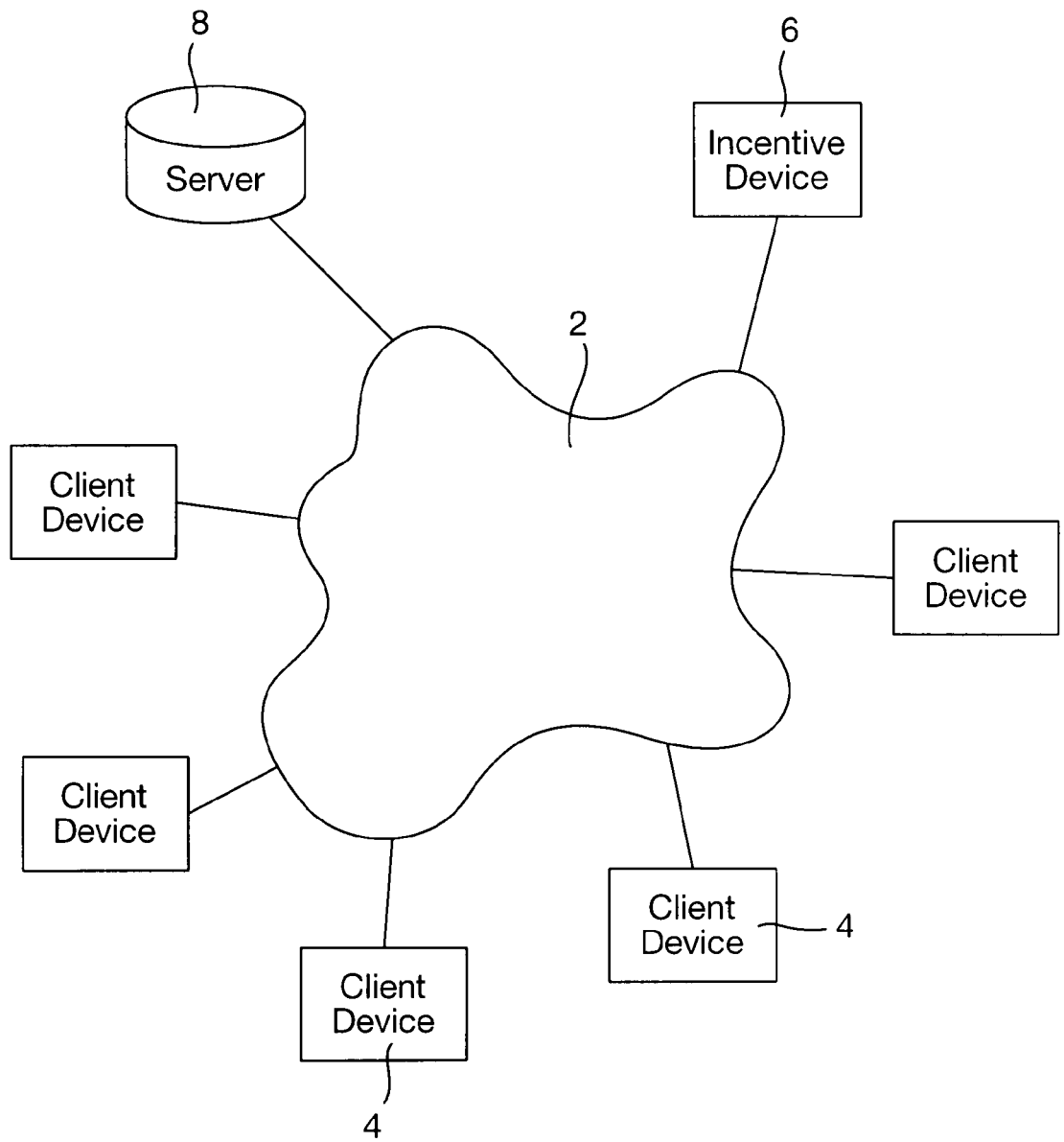
FIG. 1 illustrates schematically a network in which the present invention may be embodied.

The present application concerns the distribution of content files to various client devices on a network. FIG. 1 illustrates schematically a network 2, such as the Internet, having connected to it a plurality of client devices 4. Also illustrated in FIG. 1 are an incentive device 6 and a server 8.

It is known that an individual client device 4 may wish to obtain a content file which is available on the network 2 from the server 8. The client device 4 may transmit a request for that content file and the server 8 can transmit the appropriate content file to that client device 4. Typically, for transmission over the network, the server 8 will provide the content file as a series of packets, optionally grouped together in chunks of data.

For commercial reasons, the owner of the server 8 may require payment by the user of the client device 4 for the content file. In this regard, an interface may be used by which the owner of the server 8 charges the user, the user optionally having registered the client device 4 with the service.

It is already well-known that the data transmission requirements for the server 8 become very large when a large number of client devices 4 all request one or more different content files at overlapping times. Also, the bandwidth taken by the server connection must be very large in order to prevent unduly slow response times in downloading the required content files.

As a solution to such problems, it is known to operate a network as a peer-to-peer network in which client devices 4 are able to upload chunks of a content file onto the network 2 for download by another client device 4. Thus, when a particular client device 4 requires a particular content file which has already been distributed to a number of other client devices 4 on the network 2, it becomes possible for that client device 4 to acquire at least some of the chunks of the content file from those other client devices 4 on the network 2, rather than only from the server 8. In this way, the data transmission requirements for the server 8 can be greatly reduced and response times and efficiency of the network improved.

Peer-to-peer file sharing systems such as Bit Torrent™ have been very successful at distributing large media files in this way.

It will be appreciated from the above that any peer-to-peer file sharing network will be successful only if enough of the client devices 4 upload chunks of content files, i.e. allowing other client devices 4 to download them. However, for individual users of client devices 4, there are some drawbacks to uploading.

Uploading files from a client device 4 increases the load on the client devices network connection (in the upstream or uploading direction) so that other activities, such as web browsing, may become slower. Furthermore, many network providers have imposed limits to the total amount of data that any one client device 4 can upload. This limit may be absolute or charges may be imposed for going beyond the limits.

In order to encourage users of the client devices 4 to upload chunks of content files, it is proposed to reward those users for the additional cost of uploading by offering an incentive system. Such a system should accurately track the contribution of a user's client device 4 to the network. Hence, if a client device 4 is used to upload a large amount of data to other client devices 4, then that client device 4 will get some form of credit, for instance financial or in the way of free downloads of other content.

Unfortunately, an incentive system of this type introduces security problems. By its very nature, a peer-to-peer system does not include any central place that can oversee what a client device 4 is uploading. It is proposed here that such a system would rely on reports from the client devices 4. With an incentive system allowing rewards, such as free downloads of content, there is the problem that users will attempt to abuse the system in order to obtain content for free.

The present application considers various trust issues in proposing a technical solution to these problems. It is noted that any central incentive service cannot trust any of the peers in the network. The central service has to assume that at least some of the peers will actively try to obtain reward credits fraudulently. Similarly, peers in the system cannot trust each other. Some peers may act maliciously in an attempt to discredit the system and the company providing it. Also some malicious peers may try to take advantage of other peers or attempt to damage their reputation in the system. The only trust relationship in the system is the one of peers in the central incentive tracking system. This trust relationship can be formerly established by some form of registration or certificate system, for instance requiring the provision of credit card or bank details.

The distribution system proposed by the present application guarantees with a reasonably degree of certainty that rewards or credits will be issued only to client devices 4 that have legitimately uploaded files. It is not sufficient for the system merely to trust the claim of a client device 4 that it has uploaded and the system proposed by the present application seeks some kind of confirmation from the downloading client device 4 of the upload from the other client device 4. In this way, the trust issue is moved to trust between peers. In other words, an uploading client device 4 relies on the downloading client device 4 to confirm its upload claim. Of course, there is a possibility that groups of fraudulent peers will cooperatively reinforce each others false claims in order to obtain fraudulently reward credits. The system proposed by the present application is intended to protect against these situations also.

Because trust between peers cannot be enforced technically, the present application proposes that, in order to create the trust relationship, the system monitors the network and eliminates client devices 4 that behave irresponsibly, by banning them from the system. It is proposed that users of the system which wish to be eligible for the reward credits will have to be registered on the system, for instance registering credit card details. It then becomes possible to ban that user if it is found that that user is using malicious client devices 4 on the system. It would be possible to setup proxy servers, say by ISP's, that serve to offload the ISP's network, but do not participate in credit sharing. It may also be possible for users of the system to setup servers which are used purely for redistribution of the contents. This may be embodied in two ways, servers which serve the purpose of offloading the network, but do not participate in the reward scheme, and servers which do participate in the rewards scheme but share some portion of the rewards with clients under them (i.e. multi level marketing.).

The system is arranged to be cautious in banning users. It is recognised that some client devices 4 may be shut down at the critical moment between completing a download of a chunk of content file and confirming that download. The system of the present application is arranged to pardon accidental errors in transactions and to look only for systematic abuse in order to ban particular users.

The following description provides an overview of the threats to the distribution system which are addressed by the present invention.

The client software may be hacked, it may contain data which it uses to claim credits, for instance the number of bytes uploaded, the number of bytes downloaded etc, and an attacker may attempt to change this data. The client may be reverse engineered. Where secret data, keys, protocols or algorithms are stored on the client side, an attacker may attempt to reverse engineer the client or the protocols. A small number of attackers may attempt to generate credits for a friend. A client uploader device may obtain a credit for a legitimate upload, but that upload may be unworthy of a credit, because the content file data is not subject to payment. A rogue client may upload invalid or malicious data instead of legitimate content file data. Attackers may use the network to distribute content other than the files provided by the service, i.e. piggy backing. An attack may obtain credits that were earned by other users of the system, possibly by impersonating those other users. A group of attackers may systematically cause individual peers to be blacklisted, thereby damaging the reputation of the distribution service. A botnet attack may occur in which an attacker with a large number of (possibly malicious) clients under its control generates reports of false traffic resulting in credits being issued (this being a large scale version of the friends attack). An attacker may succeed in causing a legitimate upload to not be credited to the user.

In the following description of an embodiment of the present invention, there is described a token based solution whereby the client download device 4 receiving a file pays the client upload device 4 sending that file with a token that can be exchanged for credits. Client downloading devices 4 are issued with tokens that they can exchange for chunks, possibly specific chunks, of a content file. Client upload devices 4 receive these tokens for services rendered and act as a proof that they have uploaded a certain amount of bytes of data. In effect, a client download device 4 obtains, from an incentive device 6 on the network, the right to download a content file. Tokens are issued by the incentive device 6 and preferably identify the client download device 4 as well as the download content file or a particular chunk of that content file, to which they apply. Those tokens may be encrypted or signed such that they cannot be forged. The client download device 4 is able to trade the token for an actual chunk of the content file. When the client upload device 4 sends the token to the incentive device 6, that client upload device 4 may be rewarded with credits. Fraudulently claiming uploads is difficult, because it requires forging encrypted tokens. Also, client devices 4 systematically reusing tokens (which would give them no benefit, but which would cause unneeded uploads to peers) are easily identified.

Figure 2:
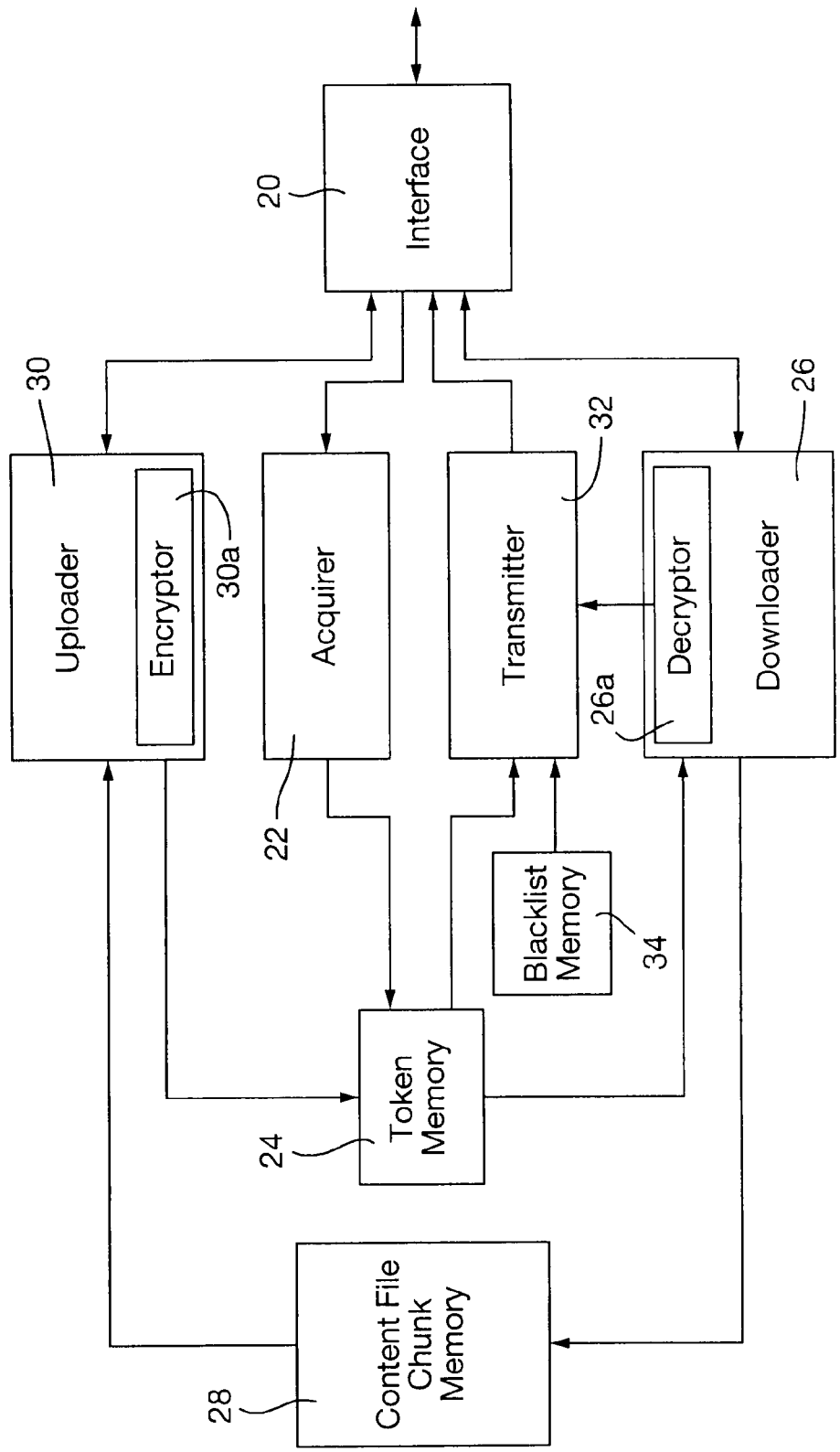
FIG. 2 illustrates schematically a client device embodying the present invention.

FIG. 2 illustrates schematically functional component parts of a typical client device 4. As illustrated, the client device 4 is operable both as a client upload device and a client download device. In this respect, it is expected that most client devices 4 which wish to operate as a client upload device in order to obtain rewards or credits will also wish to download content data and hence operate as a client download device. However, there will be some users of the distribution system who do not wish to upload content and hence operate their client devices 4 only as client download devices. Of course, the distribution system provider may themselves provide devices on the network which operate, as servers, only to upload data and hence operate as client upload devices.

Figure 3:
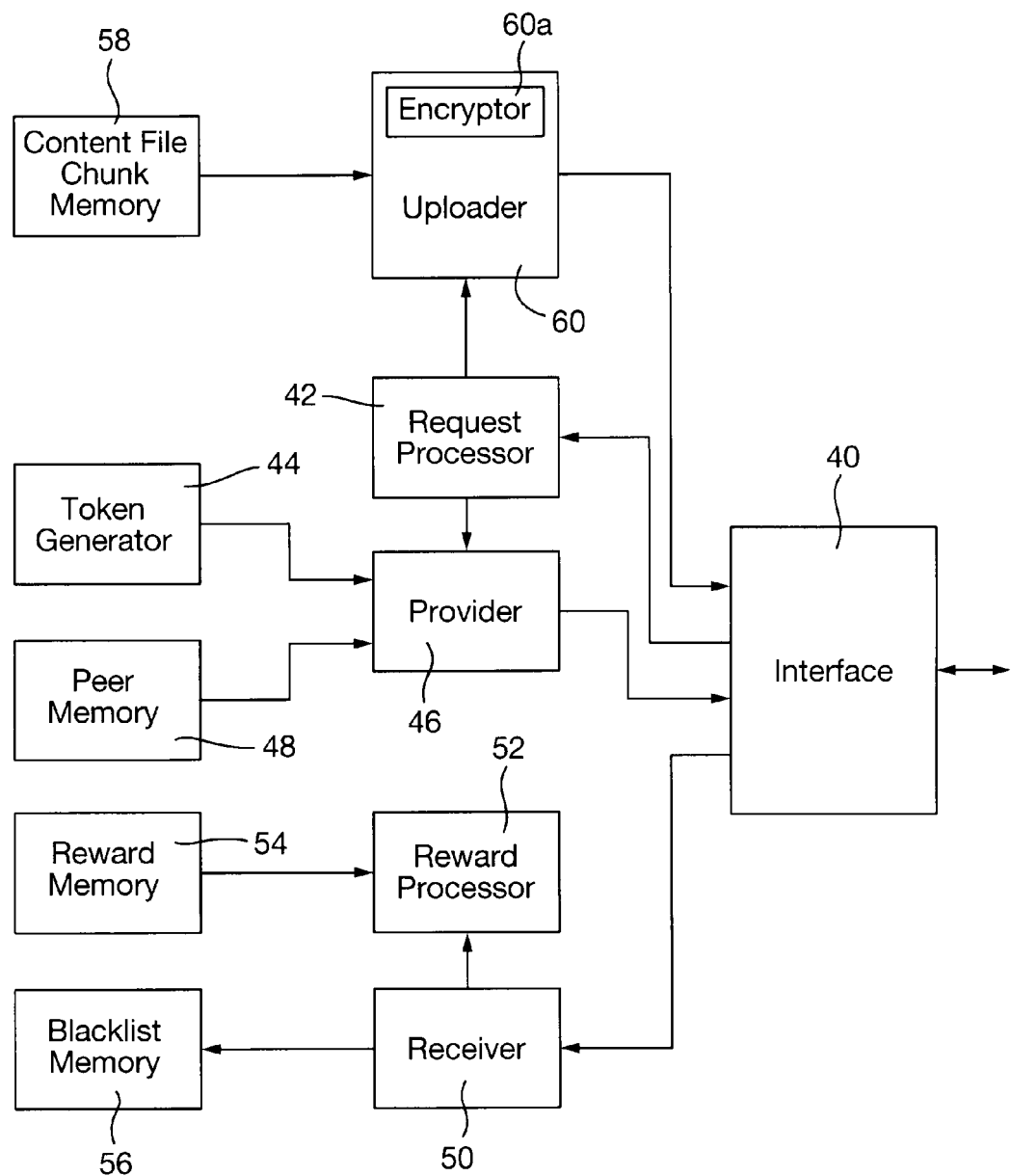
FIG. 3 illustrates schematically an incentive device embodying the present invention.

FIG. 3 illustrates schematically the functional component parts of an incentive device 6. This is illustrated as providing the functions of both issuing tokens and also receiving tokens so as to monitor use of the network. However, these functional parts can be separated in different devices on the network. Similarly, the incentive device of FIG. 3 is illustrated with capability of uploading chunks of content files, but this functionality can be provided separately, for instance merely by use of the server 8 of FIG. 1.

Operation of the client device of FIG. 2 and incentive device of FIG. 3 will now be described.

When the client device 4, operating as a client download device, wishes to obtain a particular content file, it makes use of an interface 20 to communicate with the incentive device 6 over the network 2. The user of the client device 4 is registered with the system, and preferably in exchange for some payment, the incentive device 6 issues the client download device 4 with a number of tokens in the way of token data packets.

Referring to FIG. 3, an interface 40 is used by the incentive device 6 to communicate over the network 2. A request processor 42 receives a request from the client download device 4 and ensures that the client download device 4 is authorised to receive the appropriate token data packets. A token generator 44 generates appropriate token data packets. These token data packets may include information which is hard to fabricate by a malicious user. The data of the token data packets may identify the particular client downloader device that has requested them and may identify also the particular content file to which they are to be applied. Indeed, each token data packet may apply to an individual respective chunk of the content file as identified by an ID.

Coordinated by the request processor 42, a provider 46 uses the interface 40 to send to the client download device 4 the generated token data packets.

In the illustrated embodiment, the incentive device 6 also includes a peer memory 48 which is configured to store a list of those client devices which are acting as peers storing respective content files or chunks thereof. When a client download device 4 requests token data packets from the incentive device 6 for a particular content file, the incentive device 6 can thus provide, together with the token data packets, a list of client devices 4 where the chunks of content file can be found around the network. In this way, the incentive device 6 acts effectively as a incentive in the peer-to-peer network and encourages the client download devices 4 to use known legitimate client upload devices.

The client device 4 as illustrated in FIG. 2 includes an acquirer 22 for acquiring, from the interface 20, the token data packets provided by the incentive device 6. These are stored, as illustrated, in a token memory 24.

A downloader 26 is provided for communicating with one or more client upload devices on the network via the interface 20. In particular, the downloader 26 requests, from a client upload device 4 on the network 2, a particular chunk of a required content file and exchanges for that chunk a token data packet. As illustrated, a content file chunk memory 28 is provided for storing the chunks of content file as downloaded by the downloader 26.

The client upload device 4 on the network 2 includes a content file chunk memory 28 in which chunks of content file are stored.

Via the interface 20, an uploader 30 of the client upload device 4 receives a request from a client download device 4 on the network 2 for one or more particular chunks of a content file. The uploader 30 is configured to cause the appropriate chunks of the required content file to be uploaded to the network 2 via the interface 20. At the same time, the uploader 30 causes the token data packets received from the client download device to be stored in the token memory 24.

As illustrated, the client upload device also includes a transmitter 32 in communication with the token memory 24 and the interface 20. The transmitter 32 is configured to transmit to the incentive device 6 those token data packets received by the uploader 30 in exchange for upload of chunks of content file. The transmitter 32 can be configured to transmit the token data packets to the incentive device 6 in any convenient manner. They may be transmitted as and when they are received such that the token memory 24 acts more like a buffer. Alternatively, token data packets could be transmitted in groups. In particular, the client upload device could await receipt either of a predetermined number of token data packets or for expiry of a predetermined period of time.

As illustrated in FIG. 3, the incentive device 6 includes a receiver 50 in communication with the interface 40. The receiver 50 is configured to receive via the interface 40 token data packets transmitted from the client upload devices 4. A reward processor 52 communicates with the receiver 50 so as to determine from which client upload devices token data packets have been received and to award reward credit accordingly. As illustrated, a reward memory 54 is provided for keeping a record of the reward credits assigned to the various respective client upload devices. This information can be used to allocate rewards in any convenient manner, for instance issuing financial credit and/or controlling the token generator 44 and provider 46 to provide tokens for free when the respective client upload device operates as a client download device and requests token data packets from the incentive device 6.

The reward processor 52 and receiver 50 may also be configured to analyse the received token data packets in relation to the token data packets provided in the past by the provider 46. Where persistent suspicious behaviour is found for one or more of the client devices 4, a record of those client devices 4, optionally with details of the suspicious behaviour, can be stored in a blacklist memory 56. The information stored by the blacklist memory 56 can be used by the distribution system to remove client devices 4 from the system.

In a similar manner, client devices 4 can include respective blacklist memories 34 for keeping information regarding other client devices 4 misusing the system. For instance, a client download device may keep a record of client upload devices which have received token data packets but not exchanged respective chunks of content file. Similarly, a client upload device may keep a record of client download devices which have received chunks of content file without returning valid token data packets. The information stored in the blacklist memories 34 of the client devices 4 may be transmitted periodically to the incentive device 6. This received information may be included in the blacklist memory 56 of the incentive device 6.

In order to improve the security of the exchange of chunks of content file with token data packets, one embodiment includes the use of an encrypter 30a as part of the uploader 30 of the client upload device.

With this embodiment, upon receiving a request for a particular chunk of a content file, the uploader encrypts the chunk before transmitting it to the respective client download device 4 over the network 2. Upon receipt of the token data packet from that client download device, the uploader 30 then transmits to that client upload device the appropriate decryption key. The downloader 26 of the client download device 4 includes an equivalent decrypter 26a which uses the decryption key in order to decrypt the received chunk of content file.

With this embodiment, it is possible to arrange for the decryption key provided by the uploader 30 of the client upload device 4 to include information identifying the chunk of content file and/or uploader client device. The client download device 4 may then be configured to use the transmitter 32 to transmit that decryption key information to the receiver 50 of the incentive device 6.

In this way, the incentive device 6 is able to correlate token data packets received back from client upload devices with the decryption key information originating those same client upload devices but transmitted from the respective client download devices.

As illustrated in FIG. 3, the incentive device 6 may itself include a content file chunk memory 58. By means of the request processor 42 and the corresponding uploader 60 with optional encrypter 60a, the incentive device 6 is thus able to operate as a client upload device. Thus, when receiving a request for a particular chunk of a content file, the incentive device 6 may provide that chunk in the manner of a client upload device and receive directly the corresponding token data packet. Of course, assuming that the incentive device 6 is operated by the owner of the distribution system, then there will be no need to award any credits for received token data packets.

The incentive device 6 could alternative by or additionally operate like the server 8 of FIG. 1. In particular, the incentive device 6 could receive requests for an entire content file and, in response to such a request, upload all of the chunks of that content file.

It should be appreciated that it is possible that all of the chunks of the content file might anyway be uploaded by a single client upload device 4. This might be particularly applicable where devices of the network are able to communicate in other ways, for instance providing an entire content file on a portable memory device which is transferred from one client device to another.

The chunks of content file are preferably a predetermined size, for instance ranging from 16 KB to 1 GB. Each chunk may be numbered and have a unique ID. When a client download device 4 connects to the incentive device 6, it preferably receives a fixed number of token data packets, for instance 100. Each token data packet may contain information about the incentive device 6 that created it and also the client device that is to receive it.

The proposed system provides a number of defences against potential attack or misuse.

Both the client upload device and the client download device can provide feedback about the file transfer. If this feedback is not confirmed by one of the two client devices, then the incentive device can identify a flaw in the communication and freeze the reward process.

Where client download device received a (preferably randomly generated) list of peers usable as client upload devices, if the client download device claims a file download from a peer that was not provided in the list of peers, then the incentive device can identify an illegal action and freeze the reward process.

Although blacklisting is preferably server based, in one embodiment client devices are able to store a blacklist which will prevent them from communicating with known malicious users.

The incentive device can hold all of the monitoring information for the system and can isolate or ban malicious client devices from the system.

The unique token data packets mean that client devices will be paid only once for each transaction that they are making and that malicious users will not have the opportunity to stay long in the system. In particular, malicious users will run out of tokens when they are identified.

Preferably, in order to be part of the distribution system, client devices are provided with client software configuring that client device to operate according to the requirements of the system. Each client software version may have a signature that will allow the incentive device to identify the version of the software. If a client device runs a software version that is hacked, that client device can be prevented from connecting to the incentive device until it updates to the latest version of the software. Controlled software like in a DRM playback system may not be required. Preferably, the system is secured by the server and the trust model implemented in the protocol. If a client runs software that does not behave, the client is banned.

The situation where client information is hacked to increase content is not applicable, because only the incentive device can produce the required unique tokens that will be exchanged for reward.

Where a client is reversed engineered and can generate a message to try and gain profit, the software signature can be used to ensure that client devices are running up-to-date versions of the software.

Multiple client devices may attempt to download the same content from a local area network in order to favour an upload device. However, by making use of the peer list randomly generated and provided by the incentive device, there is no guarantee that that particular uploader will be selected.

The incentive device can block consecutive download attempts that do not result in purchasing from the same client device. Alternatively, the system can be arranged to require payment in order to start downloading. The incentive device can be behind a firewall PC or software that will identify and block denial-of-service attacks. In particular, the software will accept a maximum number of connection and then reject all further incoming connections.

A flash crowd attack is one in which non-hacked clients decide simultaneously to connect to the system with the purpose of crashing it or creating confusion. Because the client devices select their peers randomly, the main danger from this type of attack is the load on the incentive device. It is proposed to define a maximum number of client devices that an incentive device can serve. If there are more client devices than allowed by that maximum, they could be blocked for a period of time or backup incentive devices could be provided.

It is possible for the entire environment to be hacked, for instance where there are many malicious users or botnets in the system. Even if the attackers reverse engineer or hack client devices, the present invention allows statistical and historical analysis of the system. By keeping log files in the incentive device with the token and client device history, it is possible to identify chains of client devices exchanging content that do not lead to purchase. It is possible then to isolate or ban most client devices from the system.

Various algorithms can be used to define faulty and suspicious behaviour.

In one embodiment, it is proposed to provide seeding nodes as part of the network. The seeding nodes are used as additional rogue client devices in order to try and identify if the uploader client devices are behaving properly. The seeding node client devices will not participate in the network as upload client devices, but only as client download devices. Hence, where the incentive device provides a peer list, the seeding node client devices will not appear in that list.

Seeding node client devices periodically contact client upload devices and confirm that they are uploading content correctly. Requests for download of chunks of content files will be masked as a normal client download device request such that the client upload devices will not know of the existence of the seeding node client devices in the system.

As a variation to the method discussed above, it is possible to provide token data packets which are merely a generic means of payment for transaction between client devices. Having received token data packets from the incentive device, the client devices can then use them to download and upload content from each other as required. When downloading the client devices give tokens and when uploading, they receive tokens. Periodically, for instance each month, the tokens may be returned to the incentive device and the client device is rewarded accordingly. After this step, new tokens may be issued from the incentive device.

This arrangement has the advantage that the flow of tokens can easily be tracked and the network paths that are created can be identified. Also, in a hacked environment, two hacked clients will not benefit by contacting each other, as the tokens will be just passed from one another.

As well as the token based system, there is proposed a report based system for addressing the problems discussed above. In this system, upload and/or download reports are sent to an incentive device on the network. The authenticity of each report is based on verifying a chain of trust. Methods of checking the report include signing systems or cross-checking so as to check false reports.

It is proposed that each chunk of a content file is associated with and accompanied by a certificate taking the form of a report data packet. The report data packet identifies the chunk and also describes the complete list of all client devices 4 that the chunk has travelled through in order to reach the client device 4 which is downloading it. The report data packet is digitally signed by all client devices 4 that it passes through. In this way, it is possible to validate the authenticity of the report data packet. Indeed, it also becomes possible to verify that the chunk of content file originates one of the servers 8 of the system providing the content. In this respect, the report based packet may also include information regarding the server 8 from which it originates.

In the situation where a client upload device 4 is uploading a chunk of content file on to the network 2 for download by a client download device 4, the respective associated report data packet is passed on as well. Upon completion of the transfer, both the client upload device 4 and the client download device 4 sends a report of the upload/download to the incentive device 6 on the network 2. It is possible for the report to include with the report data packet the identities of the client upload device 4 and the client download device 4. Upon receipt of matching reports, the incentive device 6, can grant reward credits to the client upload device 4. The client download device 4 adds itself to the report data packet before acting as a client upload device and passing it on to other client devices 4.

Using the report data packets, facilitates significantly detection of fraud, because it becomes possible to recreate the complete download graph. Client devices 4 fraudulently claiming credits for uploads are unsuccessful as there will be no matching reports of download. Also, client devices which systematically download without reporting can also be identified.

Figure 4:
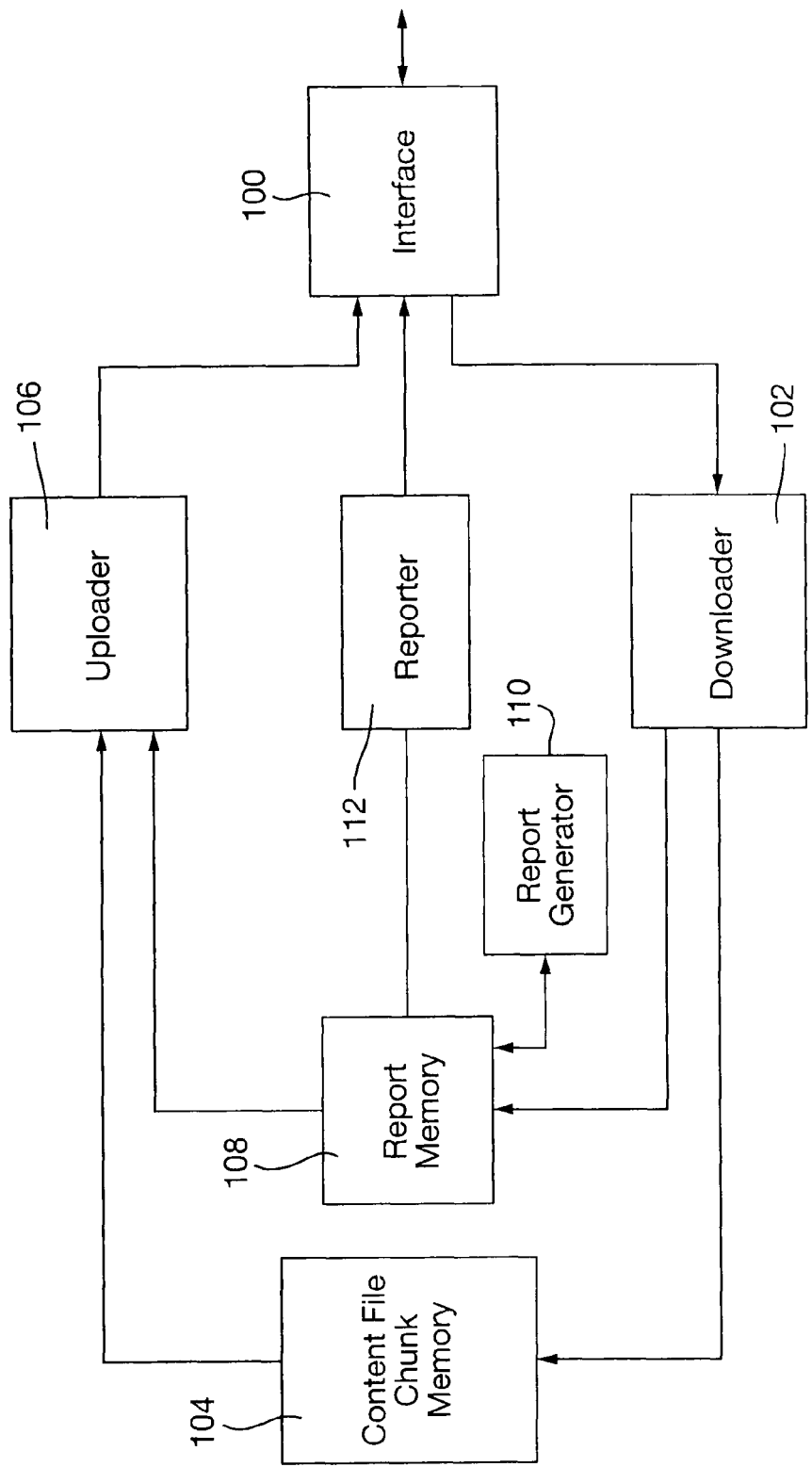
FIG. 4 illustrates schematically another client device embodying the present invention.

FIG. 4 illustrates schematically a client device 4 for use as part of the system. As illustrated, the client device 4 is configured both to function as a client upload device for uploading chunks of content file and also as a client download device for downloading chunks of content file. In practice, there will be some client devices 4 on the network which are not used for uploading purposes and, hence, include only the download functions. It will be usual for devices to only use the uploading functions. Indeed such devices are likely to be limited to devices operated by the owners of the system operating as servers for supplying content.

An interface 100 is provided connecting the client device 4 to the network 2. Using this interface 100, a downloader 102 functions to download from other client devices 4 on the network 2 acting as client upload devices chunks of content file. The functions of identifying appropriate client upload devices and requesting upload of appropriate chunks can be carried out in any manner known for peer-to-peer networks.

As illustrated in FIG. 4, a content file chunk memory 104 is provided for storing the chunks of content file obtained by the downloader 102.

When operating as a client upload device 4, the client device of FIG. 4 uses an uploader 106 to obtain the required chunks of content file from the content file chunk memory 104 and upload them to the network 2 via the interface 100.

As part of the report system mentioned above, a report memory 108 is provided. The report memory 108 stores report data packets for the chunks of content file obtained by the downloader 102 and stored in the content file chunk memory 104. In particular, when the downloader 102 obtains a chunk of content file from a client upload device, it also receives from that client upload device a report data packet identifying the chunk of the content file and the chain of client upload devices from which that chunk was downloaded. As will be discussed further below, that chain includes details identifying the client upload device from which the client download device (for instance the client device of FIG. 4) obtained the chunk of content file, together with details identifying any earlier client devices 4 in the chain of download as appropriate.

In order to maintain the report data packets up-to-date according to each upload/download step, the client device includes a report generator 110 which generates respective report data packets at least for the chunks of content file which are to be uploaded by the uploader 106. In particular, as will be discussed further below, the report generator appends, to the details identifying the chain of client devices in a respect report data packet, details of the client device of which the report generator 110 forms a part. The generated new report data packet is then sent by the uploader 106 with the respective chunk of content file.

As illustrated, the report memory 108 is configured to store downloaded report data packets. These can then be processed by the report generator 110 which either stores new report data packets in a separate part of the report memory 108 or replaces the previous report data packets. It should be appreciated, however, that, in other embodiments, the report generator 110 could update report data packets as they are received such that the report memory 108 only stores the updated report data packets. Alternatively, the report memory 108 could store only the received report data packets and the report generator 110 could provide from those stored received report data packets new and updated report data packets only as and when required by the uploader 106.

As illustrated in FIG. 4, the client device is also provided with a reporter 112.

The reporter 112 is configured to send to the incentive device 6 the appropriate respective report data packet whenever an upload/download of a chunk of content file occurs. The system can be configured such that either or both of the reporters 112 of the respective client upload device and client download device send a report data packet to the incentive device 6 when an upload/download occurs. If only one of the client upload device and client download device sends the relevant report data packet, then the other must at least identify the respective chunk and its path between the client upload device and the client download device.

Figure 5:
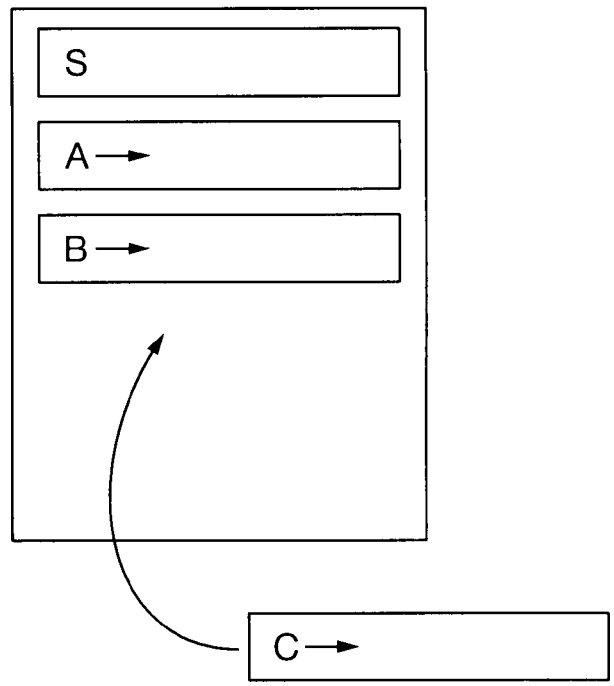
FIGS. 5, 6 and 7 illustrates schematically consecutive updates to a report data packet.

FIG. 5 illustrates schematically the report data packet received by a client device C when downloading a chunk of a content file from a client device B. As illustrated, the report indicates that the chunk of the content file originated with a server S, was received by a client device A and was then received by a client device B. As illustrated in FIG. 5, the report generator 110 updates the received report data packet to indicate that the chunk has now been received by client device C.

Figure 6:
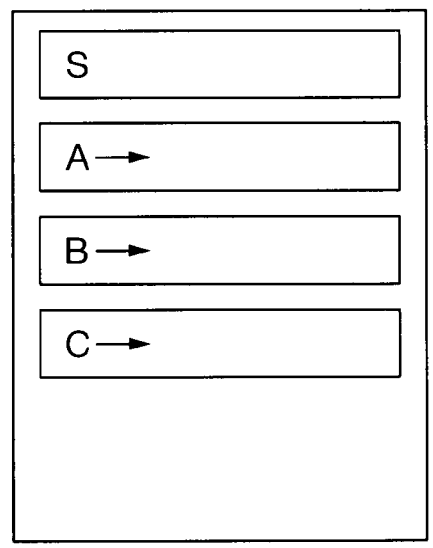

If client device C now uploads the chunk of content file and this is downloaded by client device D, then client device D receives a report data packet as illustrated in FIG. 6 indicating the additional previous receipt by client device D in the chain of client upload devices.

Figure 7:
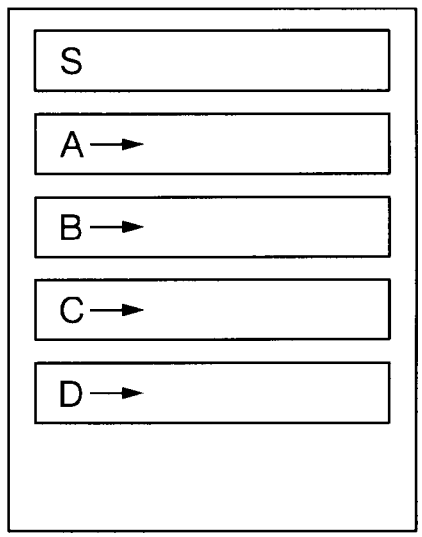

As part of this upload/download process, the reporter 112 of client device C can send the updated report data packet illustrated in FIG. 6 to the incentive device 6 on the network. It also provides an indication that the chunk of the content file is being uploaded to the client device D. At the same time, client device D that is downloading the chunk of the content file sends a corresponding report to the incentive device 6. It is possible for the reporter 112 of client device D merely to send also the report data packet illustrated in FIG. 6, together with identification of the client device as being client device D or the reporter 112 could send an updated report data packet as illustrated in FIG. 7 which itself additionally indicates that the chunk of content file was downloaded to the client device D.

If the client upload device C sends the report data packet, together with an indication of the client download device, it is possible merely for the client download device D to send a report confirming receipt from client upload device C. However, more preferably, the client download device D sends a report including the report data packet and the client upload device merely indicates that the chunk of content file has been uploaded to client download device D.

Figure 8:
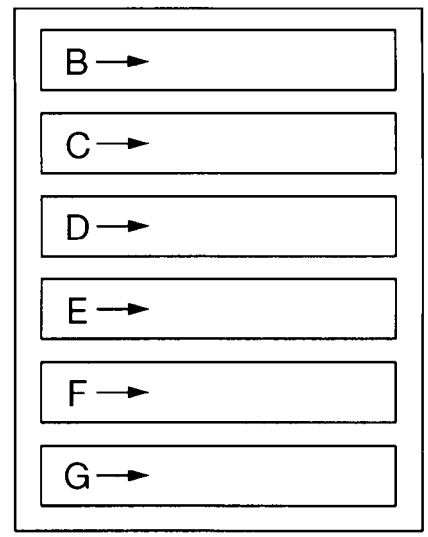
FIG. 8 illustrates schematically overflow of a report data packet.

As a chunk of content file is passed from client device to client device, the chain of client upload devices will get longer and longer. It is possible to specify a predetermined maximum number of client upload devices to be listed in the report data packet. Preferably that predetermined maximum is a significant plurality allowing good tracking of the history of the chunk of content file. However, it is then possible, with the predetermined maximum, to allow earlier client upload devices in the chain to be deleted in order to allow space for the client updates. In the example of FIG. 8, using a predetermine maximum of six entries, the entries of S and A of FIGS. 5 to 7 have been deleted in order to provide space for the more recent entries of F and G.

When the predetermined maximum is reached, it is also possible to replace the entire chain with a summary report. In this respect, the incentive device 6 may store details of earlier parts of the chain deleted form the report data packet.

Figure 9:
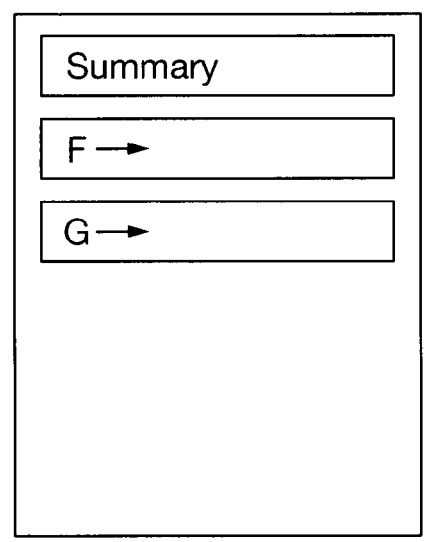
FIG. 9 illustrates schematically an alternative approach to overflow of a report data packet.

The example of FIG. 9 corresponds to that of FIG. 8. When the respective chunk was uploaded to client device E, the report data packet became full and was replaced by a summary report data packet which was subsequently updated, as illustrated in FIG. 9 with client devices F and G.

One variation of this is to provide a "summary report" which is actually details of a single node, namely the incentive system provider, to replace the entire chain of nodes previously logged.

These systems may be more useful with encrypted reports as will be discussed below.

In one embodiment, the report generator 110 of the client device may include encryption which is decryptable only by the incentive device 6.

In one arrangement, each additional entry to the report data packet is encrypted by the respective client device making that entry. Thus, for the example of FIG. 5, the entry made by client device C will be encrypted by client device C such that client device D and subsequent client devices will not be able to read the entry. Similarly, client device C will not be able to read the previous entries of S, A and Be and hence, will not be able to know the full history of the chain of uploads/downloads.

Figure 10:
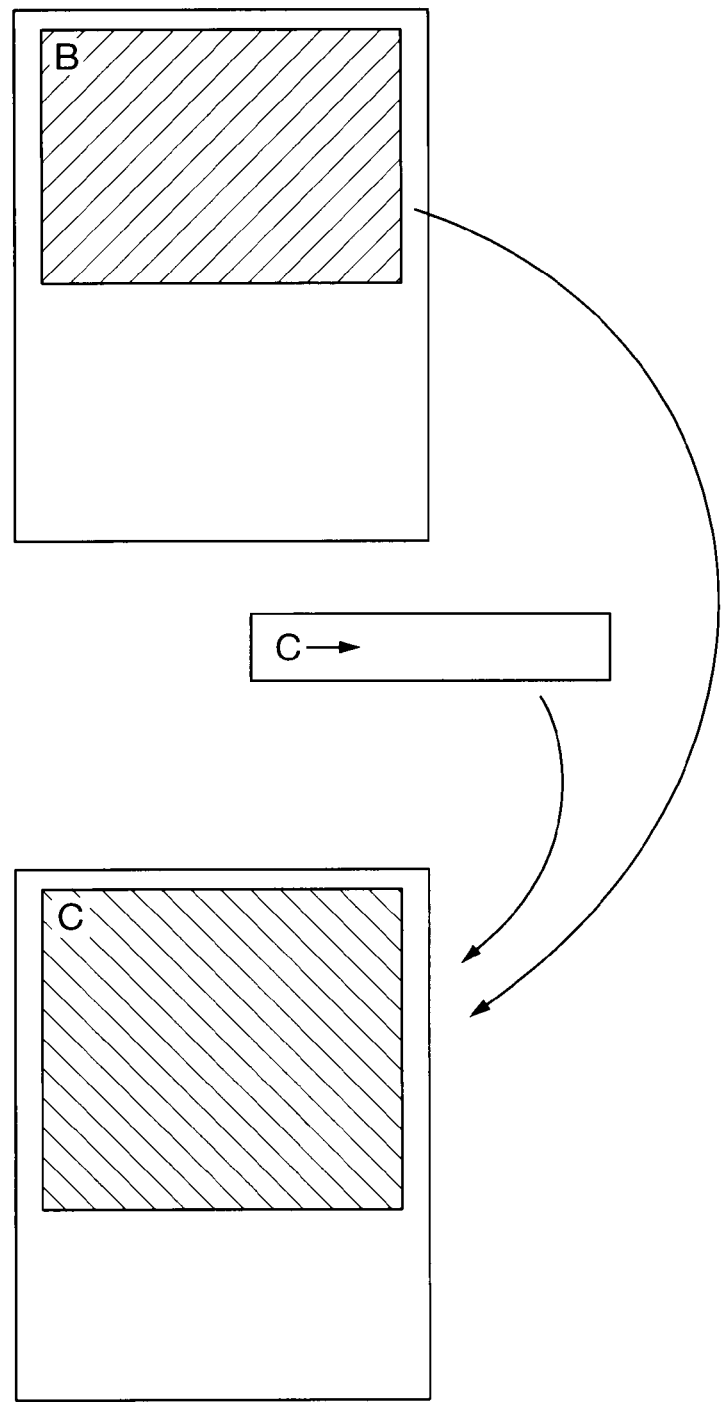
FIG. 10 illustrates encryption within a report data packet.

An alternative arrangement is illustrated schematically in FIG. 10 and corresponds to FIGS. 5 and 6. The report data packet received from client device Be is encrypted and cannot be read by client device C. Nevertheless, client device C adds its entry to the encrypted data from client device Be and encrypts the combined data as the updated report data packet for uploading to the client device D.

Although it has been indicated above that the reporter 112 will report to the incentive device 6 with each upload/download, it is possible for the reporter 112 to operate in batches, either reporting uploads and downloads separately or together. A batch of reports may be sent after a predetermined period of time or when a predetermined number of reports have accumulated.

For high definition data, average movie files are approximately 30 GB. File sharing using a peer-to-peer approach might for example divide the files into chunks of between 256 KB and 1 GB. There are, of course, network efficiency tradeoffs according to the choice of chunk size. Smaller chunks can act to increase the size of the swarm and the efficiency of the file sharing within it. However, it also increases the load of administrative traffic on the swarm and the server. This may be a non-linear overhead for very large swarms. Assuming a 1 MB chunk size, each movie file might represent an administrative overhead of 30,720 requests multiplied by the number of exchanges between client devices 4 and the incentive device 6 required for each chunk.

Bandwidth would not typically be an issue, because the request bandwidth is very small compared to the file size. Nevertheless, processing time is required for each message received by the client devices and the number of messages received from client devices can approach O(n) when n is the number of directly connected client devices. When devising the system, it is useful to consider both the per chunk load on the associated client devices and also on any proposed central servers.

In general, the distribution system is intended to deal with attackers that have complete knowledge of all algorithms and methods being used by the network, if necessary by completely reverse engineering the client devices and examining all traffic received by and sent to the client devices 4. Attackers may have control over a client device 4, may have control over two to three client devices 4 which are part of the network 2 and can collaborate together or may have control over a large botnet of potentially thousands of client devices 4. Although mainly, attacks will attempt to get unwarranted rewards or credits from the system, some attackers may wish to inject additional material (not intended to be part of the system) and use the network 2 as a transport layer or attempt to deliberately corrupt material in the system as part of denial of service attack. Using the system as described, an attacker faces the following problems.

In the single client device case, the attacker can generate full upload reports. However, the download reports made by other client devices will directly contradict the claim.

With control of multiple client devices an attacker may create fake upload reports and attempt to produce matching download reports as support. As an example, instead of client device Page 2 reporting a download path of S to PA to PB to P9, client device Page 2 substitutes a friend F1 for P9 in the report. Friend F1 can generate matching upload reports, but the download report from PB will contradict this, since it will have no record of Page 2. If two client devices, friend F1 and friend F2, are used as substitutes for PB and P9, the reports from P9 will identify friend F2 as an imposter and F1 will be contradicted by PA's report.

On the incentive device side, a table is preferably created that can be indexed on a chunk and client device basis so as to store the path each report identifies for the segment. This can then be used to check following reports for the known path to that client device and to identify inconsistencies. Knowing, for example, that P9 downloaded via PB and PA, the path returned for that chunk in the records held for PB should match the path reported by P9.

We claim:

1. A distribution system including, for connection over a network:
   a plurality of client upload devices, each client upload device storing one or more chunks of a content file;
   a client download device configured to download from the client upload devices chunks of the content file stored by the respective client upload devices; and
   an incentive device configured to generate token data packets exchangeable for chunks of the content file; wherein
   the client download device is configured to acquire a plurality of token data packets from the incentive device and to communicate with individual respective client upload devices and thereby download, in exchange for respective token data packets, stored chunks of the content file;
   each client upload device is configured to communicate with the client download device and, thereby, upload to the client download device stored chunks of the content file in exchange for token data packets acquired by the client download device from the incentive device and is configured to transmit to the incentive device token data packets received from the client download device;
   each client upload device is configured to upload to the client download device chunks of the content file in encrypted form;
   the client download device is configured so as to send to the client upload device from which an encrypted chunk of the content file was received a token data packet;
   each client upload device is configured so as to send to the client download device a decryption key for decrypting the encrypted chunk of the content file; and
   the client download device is configured so as, upon receipt of a decryption key from a client upload device, to decrypt the respective encrypted chunk of the content file and to send to the incentive device the decryption key thereby identifying to the incentive device the respective encrypted chunk and the client upload device from which the respective encrypted chunk was received.

2. The distribution system according to claim 1 wherein:
   the client download device is configured so as to send the token data packet together with a request for the decryption key upon receipt of a chunk of the content file in encrypted form; and
   each client upload device is configured so as to send the decryption key upon receipt of a token data packet and the request for the decryption key from the client download device.

3. The distribution system according to claim 1 in combination with a server for connection over the network, the server providing all of the chunks of the content file available for upload.

4. The distribution system according to claim 1 wherein each token data packet contains information about the incentive device that generated the respective token data packet and information about the client download device to which that respective token data packet was provided.

5. The distribution system according to claim 1 wherein each chunk of the content file is numbered and has a unique ID.

6. The distribution system according to claim 1 wherein each chunk is a predetermined size between 16 KB and 1 GB.

7. A client download device for connection to a network, the network having connected thereto a plurality of client upload devices, each client upload device storing one or more chunks of a content file, and an incentive device for generating token data packets wherein the client download device includes:
an acquirer configured to acquire from the incentive device a plurality of token data packets; and
a downloader configured to communicate with individual respective client upload devices and thereby download stored chunks of the content file in exchange for respective token data packets; wherein:
each client upload device is configured to upload to the client download device chunks of the content file in encrypted form;
the downloader is configured so as to send to the client upload device from which an encrypted chunk of the content file was received a token data packet and to receive, from the respective client upload device, a decryption key for decrypting the encrypted chunk of content file; and
the downloader is configured so as, upon receipt of the decryption key from the client upload device, to decrypt the respective encrypted chunk of the content file and to send to the incentive device the decryption key thereby identifying to the incentive device the respective encrypted chunk and the client upload device from which the respective encrypted chunk was received.

8. An incentive device for connection to a network, the network having connected thereto a plurality of client upload devices, each client upload device storing one or more chunks of a content file, and a client download device for downloading chunks of the content file from the client upload devices wherein the incentive device includes:
a token generator for generating token data packets exchangeable for chunks of the content file;
a provider configured to provide the client download device with a plurality of token data packets so as to enable download of chunks of the content file from a plurality of client upload devices in exchange for respective token data packets; and
a receiver configured to receive from the client upload devices token data packets received by the client upload devices in exchange for upload of chunks of the content file to the client download device; wherein:
each client upload device is configured to upload to the client download device chunks of the content file in encrypted form, the client download device being configured so as to send to the client upload device from which an encrypted chunk of the content file was received a token data packet, each client upload device being configured so as to send to the client download device a decryption key for decrypting a respective encrypted chunk of the content file and the client download device being configured so as, upon receipt of a decryption key from a client upload device, to decrypt the respective encrypted chunk of the content file; and
the incentive device is configured to receive from the client download device, the decryption key identifying the respective encrypted chunk and the client upload device from which the respective encrypted chunk was received.

9. The incentive device according to claim 8 wherein:
the incentive device is configured to provide a plurality of token data packets to the client download device in response to a request for the content file in chunks and to provide with the plurality of token data packets a peer list which indicates client upload devices on the network from which chunks of the content file can be downloaded.

10. The incentive device according to claim 8 wherein:
the incentive device is configured to act as a client uploader device in so far as communicating with the client download device to upload to the client download device stored chunks of the content file.

11. The incentive device according to claim 8 wherein:
the incentive device is configured to upload to the client download device all of the chunks of the content file upon receipt of a request, transmitted from the client download device, for the entire content file.

12. The incentive device according to claim 8 wherein:
the incentive device is configured to reward client upload devices according to token data packets received from respective client upload devices.

13. The incentive according to claim 12 wherein:
the incentive device is configured to reward client upload devices by providing to the client upload devices new token data packets for exchange for chunks of other content files.

14. A method of distributing content files to client devices on a network using a plurality of client upload devices connected to the network, each client upload device storing one or more chunks of a content file, the method including:
generating token data packets exchangeable for chunks of the content file;
providing the token data packets to a client download device;
exchanging token data packets from the client download device for chunks of the content file stored in respective client upload devices; and
transmitting token data packets received from the client download device to an incentive device for tracking the distribution; wherein:
the chunks of the content file are uploaded to the client download device in encrypted form and a decryption key for decrypting an encrypted chunk of the content file is sent to the client download device from each of the client upload devices; and
upon receipt of a decryption key from a client upload device, the respective encrypted chunk of the content file is decrypted and the decryption key is sent to the incentive device to identify to the incentive device the respective encrypted chunk and the client upload device from which the respective encrypted chunk was received.

15. A method of downloading a content file from a plurality of client upload devices over a network including:
acquiring from an incentive device on the network a plurality of token data packets; and
communicating with individual respective client upload devices, each client upload device storing one or more chunks of the content file, thereby to download stored chunks of the content file in exchange for respective token data packets; wherein:
the chunks of the content file are downloaded in encrypted form and a decryption key for decrypting an encrypted chunk of the content file is received from each of the client upload devices; and
upon receipt of a decryption key from a client upload device, the respective encrypted chunk of the content file is decrypted and the decryption key is sent to the incentive device to identify to the incentive device the respective encrypted chunk and the client upload device from which the respective encrypted chunk was received.

16. A method of monitoring distribution of a content file over a network including:

generating token data packets exchangeable for chunks of the content file;

providing a client download device with a plurality of token data packets so as to enable download of chunks of the content file from a plurality of client upload devices in exchange for respective token data packets; and receiving from client upload devices token data packets received by the client upload devices in exchange for upload of chunks of the content file to the client download device; wherein:

the chunks of the content file are uploaded to the client download device in encrypted form and a decryption key for decrypting an encrypted chunk of the content file is sent to the client download device from each of the client upload devices; and upon receipt of a decryption key from a client upload device, the respective encrypted chunk of the content file is decrypted and the decryption key is sent to the incentive device to identify to the incentive device the respective encrypted chunk and the client upload device from which the respective encrypted chunk was received.

17. A non-transitory computer-readable storage medium storing computer-readable instructions thereon, which, when executed by a computer, cause the computer to perform a method of downloading a content file from a plurality of client upload devices over a network, the method comprising:

acquiring from an incentive device on the network a plurality of token data packets; and communicating with individual respective client upload devices, each client upload device storing one or more chunks of the content file, thereby to download stored chunks of the content file in exchange for respective token data packets; wherein:

the chunks of the content file are downloaded in encrypted form and a decryption key for decrypting an encrypted chunk of the content file is received from each of the client upload devices; and upon receipt of a decryption key from a client upload device, the respective encrypted chunk of the content file is decrypted and the decryption key is sent to the incentive device to identify to the incentive device the respective encrypted chunk and the client upload device from which the respective encrypted chunk was received.

18. A non-transitory computer-readable storage medium storing computer-readable instructions thereon, which, when executed by a computer, cause the computer to perform a method of monitoring distribution of a content file over a network, the method comprising:

generating token data packets exchangeable for chunks of the content file;

providing a client download device with a plurality of token data packets so as to enable download of chunks of the content file from a plurality of client upload devices in exchange for respective token data packets; and receiving from client upload devices token data packets received by the client upload devices in exchange for upload of chunks of the content file to the client download device; wherein:

the chunks of the content file are uploaded to the client download device in encrypted form and a decryption key for decrypting an encrypted chunk of the content file is sent to the client download device from each of the client upload devices; and upon receipt of a decryption key from a client upload device, the respective encrypted chunk of the content file is decrypted and the decryption key is sent to the incentive device to identify to the incentive device the respective encrypted chunk and the client upload device from which the respective encrypted chunk was received.

* * * * *